United States Patent Office 2,939,762
Patented June 7, 1960

2,939,762

SODIUM BOROHYDRIDE FROM SODIUM HYDRIDE AND EXCESS TRIMETHYL BORATE

Robert G. Berner, New Providence, Rene P. Berni, Hasbrouck Heights, and Stanley J. Klach, Haskell, N.J., assignors to Callery Chemical Company, Pittsburgh, Pa., a corporation of Pennsylvania No Drawing. Filed June 9, 1955, Ser. No. 514,388

6 Claims. (Cl. 23—14)

This invention relates to the preparation of sodium borohydride ($NaBH_4$) and more particularly to its preparation by the reaction of sodium hydride (NaH) and trimethyl borate $B(OCH_3)_3$, in the presence of tetrahydrofuran.

Several methods for preparing sodium borohydride have been developed and patented or otherwise described in the literature. The first of these involved the reaction of sodium hydride with trimethyl borate to form sodium trimethoxyborohydride, $NaBH(OCH_3)_3$, which was further reacted with diborate $B_2H_6$ to yield sodium borohydride and trimethyl borate. Later, it was found that sodium trimethoxyborohydride disproportionated at about 230° C. to form sodium borohydride and sodium tetramethoxyborate, $NaB(OCH_3)_4$. Another method made use of the reaction of sodium hydride and trimethyl borate in a 4:1 molar ratio in an autoclave without solvent at a temperature of about 250° C. to yield sodium borohydride and sodium methoxide, $NaOCH_3$, directly. Other reported methods involved the reaction of an alkali metal alkoxide, NaOR, with diborane, sodium hydride with boric oxide or the reaction of metallic sodium and hydrogen with trimethyl borate. Most of these methods resulted in poor yields of sodium borohydride due to the formation of by-products. Our experiments show that under the conditions used in this process it is highly advantageous to use a large excess of trimethyl borate rather than an excess of sodium hydride.

One object of this invention is to provide a new and improved method for preparing sodium borohydride in high yields from sodium hydride and trimethyl borate in the presence of tetrahydrofuran.

Another object is to provide a new and improved method for preparing sodium borohydride from sodium hydride and trimethyl borate at relatively low temperatures.

Another object is to provide a new and improved method for preparing sodium borohydride by reaction of sodium hydride and trimethyl borate in suspension in tetrahydrofuran.

Another object is to provide a new and improved process for preparing sodium borohydride by reaction of sodium hydride with a relatively large excess of trimethyl borate in tetrahydrofuran at about the reflux temperature thereof.

Other objects will become apparent from the specification and claims which follow.

This new and improved method will be more completely described hereinafter and the novelty thereof will be particularly pointed out and distinctly claimed.

This invention is based upon our discovery that when sodium hydride and trimethyl borate are reacted in the presence of tetrahydrofuran sodium borohydride is produced at a much lower temperature (about 65° C.) and in better yields than were previously obtainable. We have also found that when sodium hydride is reacted with an excess of trimethyl borate in tetrahydrofuran substantially better yields of sodium borohydride are obtained than when an excess of sodium hydride is used. Furthermore, we have discovered that the use of excess trimethyl borate in addition to increasing the reaction yield permits the sodium borohydride to be filtered more easily from the reaction mixture and assists in controlling the heat of reaction. We have also discovered that the approximate optimum conditions for this method are: (1) a large stoichiometric excess, preferably of the order of 650%, of trimethyl borate, based on the reaction

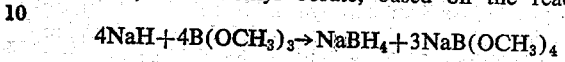

$$4NaH + 4B(OCH_3)_3 \rightarrow NaBH_4 + 3NaB(OCH_3)_4$$

(2) 100% more tetrahydrofuran than is required to dissolve the sodium tetramethoxyborate formed, (3) a concentration of triemthyl borate of not less than 50% by volume (4) a reaction time of 0.75 to 1.5 hours, (5) a reaction temperature of 65° C., which is the refluxing temperature of tetrahydrofuran and trimethyl borate, and (6) completely anhydrous and alcohol free tetrahydrofuran and trimethyl borate.

The apparatus used for studying this reaction consisted of a large round bottom flask fitted with a stirrer, reflux condenser, thermometer and nitrogen inlet. Heat was applied to the flask with a heating mantle. The tetrahydrofuran and trimethyl borate were dried over sodium hydride and sodium respectively to remove all water and alcohol and then fractionated for further purification before reaction. The reactants were placed in addition tubes in a dry box to exclude moisture. The reaction flask was swept out with dry nitrogen and two of the reactants were added and well mixed before the addition of the third reactant. After the reaction was completed, the slurry was filtered under vacuum and washed with hot tetrahydrofuran. The filter cake was extracted with ammonia to separate the sodium borohydride and filtered from the residue which consisted of decomposition products that were insoluble in the solvent used. The reaction yield was determined according to the equation

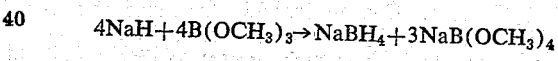

$$4NaH + 4B(OCH_3)_3 \rightarrow NaBH_4 + 3NaB(OCH_3)_4$$

Using the apparatus and procedure above described the effect of using various stoichiometric excesses of trimethyl borate (based on the reaction

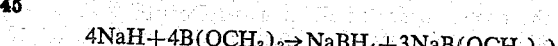

$$4NaH + 4B(OCH_3)_3 \rightarrow NaBH_4 + 3NaB(OCH_3)_4)$$

was studied at temperatures of 55°–65° C. In this series of experiments tetrahydrofuran was added to different mixtures of trimethyl borate and sodium hydride with the following results:

| Run No. | Mols NaH | Mols $B(OCH_3)_3$ | Percent Excess $B(OCH_3)_3$ | Mls. THF | Addition Time (Hrs.) | Reaction Time (Hrs.) | Percent Yield $NaBH_4$ |
|---|---|---|---|---|---|---|---|
| 1 | 0.55 | 0.55 | 0 | 50 | 0.5 | 3.0 | 47.5 |
| 2 | 0.5 | 1.0 | 100 | 250 | 0.5 | 1.0 | 74.3 |
| 3 | 0.2 | 0.6 | 200 | 100 | 0.5 | 1.0 | 78.5 |
| 4 | 0.5 | 2.0 | 300 | 100 | 0.5 | 0.75 | 78.8 |
| 5 | 0.2 | 1.5 | 650 | 110 | 0.5 | 1.50 | 83.5 |

It is apparent from these data that as the excess of trimethyl borate over the sodium hydride used increases the yield of sodium borohydride also increases. The rate of filtration of the sodium borohydride also increased when larger excesses of trimethyl borate were used.

In another series of experiments the reaction time was studied in order to determine its effect upon the yield of sodium borohydride in this process. In these runs sodium hydride was added to a mixture of trimethyl borate and tetrahydrofuran at 55°–65° C. with the following results:

| Run No. | Mols NaH | Mols B(OCH$_3$)$_3$ | Percent Excess B(OCH$_3$)$_3$ | Mls. THF | Addition Time (Hrs.) | Reaction Time (Hrs.) | Percent Yield NaBH$_4$ |
|---|---|---|---|---|---|---|---|
| 1 | 0.55 | 1.5 | 200 | 200 | 0.5 | 2.0 | 48.6 |
| 2 | 0.50 | 1.5 | 200 | 56 | 0.25 | 1.1 | 75.3 |
| 3 | 0.30 | 2.25 | 650 | 150 | 0.25 | 0.4 | 49.8 |
| 4 | 0.20 | 1.50 | 650 | 200 | 0.25 | 0.75 | 99.5 |

These runs together with other data show that the maximum yield of sodium borohydride is obtained by using a reaction time of about .75 to 1.5 hours. Reaction time of less than .75 hour reduced the yield significantly while reaction times of more than about 1.5 hours apparently produce side reactions which decrease the yield.

In another series of runs approximately equimolar quantities of sodium hydroxide and trimethyl borate were reacted in different quantities of tetrahydrofuran to determine the effect of concentration of reactants on the reaction yield. In this series of runs the trimethyl borate was added to a slurry of sodium hydride in tetrahydrofuran in order to determine the effect of order of addition of the reactants. The following results were obtained:

| Run No. | Mols NaH | Mols B(OCH$_3$)$_3$ | Mls. THF | Addition Time (Hrs.) | Reaction Time (Hrs.) | Percent Yield NaBH$_4$ |
|---|---|---|---|---|---|---|
| 1 | 0.2 | 0.1 | 140 | 2 | 6 | 0.41 |
| 2 | 0.4 | 0.1 | 200 | 1 | 5 | 0.88 |
| 3 | 0.6 | 0.5 | 56 | 0.5 | 25 | 52.2 |

In runs 1 and 2 above it was found that if the concentration of trimethyl borate is very low (on the order of 10% by volume) the yields of sodium borohydride are negligible. When the trimethyl borate concentration is greater than about 20% the effect of the concentration disappears as shown in run 3. Suitably the concentration of the borate in the tetrahydrofuran is not less than 20 percent by volume. Conversely, while the range of concentration of the tetrahydrofuran is not critical, it was found necessary to have enough present to dissolve all the by-product sodium tetramethoxyborate formed. It was also found that when the trimethyl borate is added to the sodium hydride the yield is much lower than when the reverse order of addition is followed.

In other experiments, the three possible methods of combining the reactants were studied and it was found that the results obtained by adding sodium hydride to the other reactants were comparable to results obtained by adding tetrahydrofuran last. When trimethyl borate was added to the reactor last, the yields in general were extremely low. Since it is desirable to have an excess of trimethyl borate in the reaction, the technique of adding sodium hydride slowly to the other reactants is the most desirable method as the ratio of trimethyl borate is higher during the addition of the hydride and the liberation of the heat of reaction can be more readily controlled in the liquid reaction medium. It should also be noted that tetrahydrofuran is an ideal reaction medium for this reaction in that it has a good solubility for sodium trimethoxyborohydride and sodium tetramethoxyborate and a low solubility for sodium borohydride at the boiling point. Furthermore, tetrahydrofuran boils at 65° C. which is the temperature at which this reaction is carried out. The low temperature at which this process is carried out is a definite advantage over previous processes which required temperature of over 200° C.

Having thus described our invention fully and completely as required by the patent statutes, it should be understood that this invention may be practiced otherwise than as specifically described.

What we desire to claim and secure by Letters Patent of the United States is:

1. A method of preparing sodium borohydride which comprises contacting sodium hydride and a stoichiometric excess of trimethylborate in tetrahydrofuran to produce sodium borohydride and sodium tetramethoxyborate, sufficient trimethyl borate being used to establish it in a concentration of at least 20 percent by volume in the tetrahydrofuran and the quantity of tetrahydrofuran present being sufficient to dissolve all of the tetramethoxyborate formed, and then removing and recovering the sodium borohydride.

2. A method according to claim 1 in which the tetrahydrofuran is added to a mixture of the sodium hydride and trimethyl borate.

3. A method according to claim 1 in which the sodium hydride is added slowly to a mixture of trimethyl borate and tetrahydrofuran.

4. A method according to claim 1 in which an excess of about 650% of trimethyl borate is used.

5. A method according to claim 1 in which the reaction time is about 0.75 to 1.5 hours.

6. A method according to claim 1 in which the reaction temperature is about 65° C.

No references cited.